Patented Mar. 18, 1952

2,589,208

UNITED STATES PATENT OFFICE 2,589,208

TERT-OCTYL DI(CYANOMETHYL)AMINE

W E Craig, Philadelphia, Pa., and Martin J. Culver, Cincinnati, Ohio, assignors to Rohm & Haas Company, Philadelphia, Pa., a corporation of Delaware No Drawing. Application December 1, 1950, Serial No. 198,726

1 Claim. (Cl. 260—465.5)

This invention relates to alkyldicyanomethylamines of the formula $$RN(CH_2CN)_2$$

wherein R is an alkyl group of four to twelve carbon atoms. These compounds exhibit considerable insecticidal activity, particularly as contact poisons against soft-bodied insects, such as aphids, spiders, or mites. When the alkyl group is highly branched and particularly when the alkyl group contains a tertiary carbon atom, the alkyldicyanomethylamines give a rapid paralyzing action, as shown by an effective knockdown of flies in the standard Peet-Grady test.

Although various aminonitriles are known and some of these have been examined for pesticidal activity, this class of compounds has not been found particularly effective. Dicyanomethylamine has been suggested as an insecticidal agent, but it is lacking both in effectiveness and stability. We have found further that although a small aliphatic hydrocarbon group may be introduced in place of the hydrogen of the secondary amine, such as methyl, ethyl, allyl, or isopropyl, the resulting compound remains ineffective. Yet, surprisingly, the alkyldicyanomethylamines in which the N-alkyl substituent contains four to twelve carbon atoms have rather marked contact action against insects.

The alkyldicyanomethylamines are prepared through the reaction of a primary aliphatic amine, $RNH_2$, in which R is an alkyl group of four to twelve carbon atoms, formaldehyde, and hydrogen cyanide. The reaction theoretically requires two moles each of formaldehyde and hydrogen cyanide per mole of amine. Some excess of either or both formaldehyde and hydrogen cyanide is, of course, permissible. The exact order in which these starting materials are combined is not critical. Thus, hydrogen cyanide and aqueous formaldehyde may be reacted to form glycolonitrile, which is stabilized with acid, and then reacted with amine in water or in an alcohol-water solution at 50° C.–95° C. Again, amine and formaldehyde may be reacted in water or in an alcohol-water solution and this reaction product treated with hydrogen cyanide between 0° C. and 50° C.

As an amine there may be used any primary alkylamine which contains four to twelve carbon atoms as in the case of butyl, amyl, hexyl, heptyl, octyl, nonyl, decyl, or dodecyl groups in their various isomeric forms. Highly branched alkyl groups appear particularly desirable to impart rapid insecticidal action.

The presence of acid in the reaction mixture tends to improve yields. Thus, there may be used a small amount (0.05 to 0.2 mole) of phosphoric, formic, hydrochloric, p-toluenesulfonic, or similar acid or an acid salt such as sodium acid sulfate (per mole of amine).

The preparation of some typical compounds of this invention is shown in the following examples.

*Example 1*

To 1806 parts of tert.-octylamine there was added 84 parts of sodium bisulfate in 150 parts of water. While this mixture was stirred, there was added 2334 parts of aqueous 36% formaldehyde solution with the temperature kept at 15° C.–20° C. by external cooling. Thereto was added 781.5 parts of hydrogen cyanide with cooling. The resulting mixture was stirred for two hours at 20° C.–25° C. and then heated at 50° C. for 1.5 hours, there being used a reflux condenser cooled with ice water. The reaction mixture yielded a water layer and an oil layer, which was separated. This was crude tert.-octyldicyanomethylamine. It was distilled under low pressure. The fraction taken at 135° C.–137° C./0.8 mm., amounting to 2554 parts, was the pure product. It had a specific gravity at 20° C. of 0.9580 and a refractive index, $n_D^{20}$, of 1.4708. By analysis the product contained 20.1% of nitrogen (theory 20.2%). This product has the formula $(CH_3)_3CCH_2C(CH_3)_2N(CH_2CN)_2$.

In a standard Peet-Grady test with house flies this compound, formulated in a typical fly spray at 2%, gave a knockdown of 100% and a kill of +47 against the Official Test Insecticide. In an aqueous spray at a dilution of 1:400 it killed 100% of black bean aphids on bean plants and at a dilution of 1:3200 gave a kill of 88% against these aphids. It gave a kill of 60% of Mexican bean beetle larvae on bean plants at 1:100. It gave a kill of 89% of milkweed bug at 1:400 dilution, a kill of 63% of red spiders also at 1:400, and a kill of 100% of German cockroaches with a 1% spray in kerosene, compared with a kill of 68% with the Official Test Insecticide.

*Example 2*

There were reacted in the same way as in Example 1 caprylamine, formaldehyde, and hydrogen cyanide. The product obtained was 2-capryldicyanomethylamine, having the formula

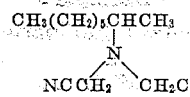

This compound was distilled at 165° C.–172° C./3 mm. and had a refractive index, $n_D^{25}$, of 1.4526 and a specific gravity at 25° C. of 0.9305. Against black bean aphids it gave a kill of 100% when applied at 1:400 in an aqueous spray.

*Example 3*

In the same way as in Examples 1 and 2 there were reacted n-octylamine, formaldehyde, and hydrogen cyanide to give n-octyl-dicyanomethyl-amine. This distilled at 173° C.–177° C./3.5 mm. and had a refractive index, $n_D^{25}$, of 1.4506 and a specific gravity at 25° C. of 0.9209. The compound gave a knockdown of 79% in the Peet-Grady test against flies. At a 1:400 dilution it gave a 100% kill of black bean aphids on beans and at 1:1600 a 58% kill.

*Example 4*

There were mixed 204 parts by weight of a dodecylamine in which the alkyl group was obtained from propylene tetramer, 800 parts of water, and 50 parts of 36% hydrochloric acid. With the temperature of this mixture at about 20° C. there was added 162 parts of 37% aqueous formaldehyde and this reaction mixture was stirred for two hours. There was then added over the course of an hour 54 parts of hydrogen cyanide and the mixture was stirred for eight hours at room temperature. The temperature was then raised to 70° C. for two hours. The layers which formed were separated. The oil layer was washed with water three times, dried on calcium sulfate, and filtered. The material thus obtained was dodecyldicyanomethylamine. It had a refractive index at 25° C. of 1.4697 and a specific gravity at 25° C. of 0.8747. This compound gave at a dilution of 1:400 a kill of 99% of black bean aphids on beans and a kill of 20% against bean beetle larvae. It gave a 67% kill of roaches in a 1% kerosene solution. A combination of 1% of butoxyethoxyethyl thiocyanate and 1.5% of the above amine in kerosene gave 100% knockdown of flies and a kill of +61 against the Official Test Insecticide.

*Example 5*

There were mixed 71.6 parts of a nonylamine of the formula (CH₃)₃CCH₂CH(CH₃)CH₂CH₂NH₂, 286 parts of water, and 25 parts of 36% hydrochloric acid and thereto was added 82 parts of aqueous 37% formaldehyde solution. This mixture was stirred for 11 hours, cooled to 10° C., and treated with 27 parts of hydrogen cyanide with cooling to keep the reaction temperature below 20° C. Stirring was continued for an hour and the reaction mixture was left standing for 48 hours. The oil layer was taken and washed twice with water. The washed product was fractionally distilled at low pressure. At 190° C.–192° C./15 mm. the product obtained corresponded in composition to nonyldicyanomethylamine. It had a refractive index at 20° C. of 1.4570 and a density at 20° C. of 0.9223. This nonyl group is a 3,5,5-trimethylhexyl radical.

This compound when tested against black bean aphids gave a kill of 94% at a dilution of 1:400 and of 89% at a dilution of 1:3200. It gave a kill of 60% of Mexican bean beetle larvae at a dilution of 1:100.

*Example 6*

There were mixed 220 parts of tert.-butylamine, 220 parts of water, and 30 parts of 36% hydrochloric acid. With this mixture at 20° C. there was added 493 parts of 36.8% formaldehyde solution. The reaction mixture was stirred for 0.5 hour. There was then added over a period of an hour 164.5 parts of hydrogen cyanide with control of temperature with external cooling. The reaction mixture was heated at 50° C. for two hours. Two layers formed. There was added 400 parts of benzene and the mixture was heated under reflux with separation of water in a trap. The organic material was fractionally distilled. The desired product, tert.-butyldicyanomethylamine, was obtained at 170° C.–174° C./30 mm. in a 45% yield. The refractive index at 20° C. was 1.4567.

This compound at 2% in kerosene gave 96% knockdown of flies in the Peet-Grady test and a kill of 92% against the black bean aphid when this compound was applied to infested bean plants at a dilution of 1:400. Against bean beetle larvae the kill was 33% at a dilution of 1:100 and against army worm 37%.

It is of interest that methyldicyanomethylamine and allyldicyanomethylamine, as typical amines with small aliphatic hydrocarbon groups, gave 0% knockdown in the Peet-Grady evaluation and 0% kill of aphids at 1:400.

*Example 7*

By the procedures above there were mixed 328 parts of a hexylamine in which the alkyl group was obtained from propylene dimer, 234 parts of water, 32.5 parts of 36% hydrochloric acid, 530 parts of 36.8% formaldehyde solution, and 175 parts of hydrogen cyanide. The mixture was maintained below 20° C. during the combining of reactants and initial stage of reaction and then kept at 50° C. for an hour. The fraction taken at 193° C.–196° C./30 mm. was hexyldicyanomethylamine. It had a refractive index of 1.438 at 20° C. and a specific gravity at 20° C. of 0.9721. It contained 23.3% of nitrogen (theory 23.4%).

This compound gave a 99% knockdown when tested at 2% by the Peet-Grady method and a kill of +4 v. O. T. I. Against black bean aphids it gave a kill of 88% when applied at a dilution of 1:400 and a kill of 53% at a dilution of 1:3200. The kill of Mexican bean beetle larvae was 33%. The kill of milkweed bug was 100% at 1:400 or at 1:800 dilution and was 98% at 1:1600 and 51% at 1:3200. A 1% solution in kerosene gave a kill of 87% of German roaches compared to the result of 75% with the Official Test Insecticide.

The test data establish a high degree of insecticidal effectiveness for alkyldicyanomethylamines with alkyl groups of four to twelve carbon atoms. Their primary value is as contact poisons, although they have also some stomach poison action, as shown by typical tests with bean beetle larvae and the like. The compounds with relatively large alkyl groups have also some fungicidal value, which increases with size of such group, being marked in the case of the dodecyl derivatives.

We claim:

As a new compound, tert.-octyldicyanomethylamine, having the structure (CH₃)₃CCH₂C(CH₃)₂N(CH₂CN)₂

W E CRAIG.
MARTIN J. CULVER.

REFERENCES CITED

The following references are of record in the file of this patent:

UNITED STATES PATENTS

| Number | Name | Date |
|---|---|---|
| 2,164,781 | Platz et al. | July 4, 1939 |
| 2,205,995 | Ulrich et al. | June 5, 1940 |

FOREIGN PATENTS

| Number | Country | Date |
|---|---|---|
| 404,744 | Great Britain | Jan. 25, 1934 |

OTHER REFERENCES

Knoevenagel et al., Beilstein (Handbuch, 4th ed.), vol. 4, p. 368 (1922).